US005490681A

United States Patent [19]
Plunkett et al.

[11] Patent Number: 5,490,681
[45] Date of Patent: Feb. 13, 1996

[54] THREE LAYER METAL GASKET WITH DUAL COATING

[75] Inventors: Thomas P. Plunkett, Lemont; Michael J. Kestly, Bolingbrook, both of Ill.

[73] Assignee: Dana Corporation, Toledo, Ohio

[21] Appl. No.: 310,919

[22] Filed: Sep. 22, 1994

[51] Int. Cl.$^6$ ...................................................... F10J 15/08
[52] U.S. Cl. ................................ 277/235 B; 277/235 A
[58] Field of Search ........................... 277/235 R, 235 A, 277/235 B, 227, 180, 207 R

[56] References Cited

U.S. PATENT DOCUMENTS

| | | | |
|---|---|---|---|
| 4,834,399 | 5/1989 | Udagawa et al. | 277/234 |
| 4,861,046 | 8/1989 | Udagawa | 277/235 |
| 4,867,462 | 9/1989 | Udagawa | 277/235 |
| 4,898,396 | 2/1990 | Udagawa | 277/235 |
| 4,938,488 | 7/1990 | Udagawa et al. | 277/235 |
| 4,976,445 | 12/1990 | Udagawa | 277/231 |
| 4,995,624 | 2/1991 | Udagawa et al. | 277/235 |
| 5,076,595 | 12/1991 | Udagawa | 277/232 |
| 5,255,926 | 10/1993 | Udagawa | 277/235 |
| 5,277,434 | 1/1994 | Kestly et al. | 277/235 |
| 5,431,418 | 7/1995 | Hagiwara et al. | 277/235 B |

*Primary Examiner*—Daniel G. DePumpo
*Attorney, Agent, or Firm*—Dykema Gossett

[57] ABSTRACT

An improved multi-layer gasket comprises only three metal plates and incorporates a dual coating system with different coatings applied to specific layers of the gasket. Through the orientation of the layers, a high temperature coating is used to enhance a combustion gas seal while an elastomer seal coating enhances a fluid seal. Through the selection of base metal thicknesses and coating thicknesses, an increased thickness area can be achieved to obtain an optimum load balance between the combustion seal and the fluid seal.

19 Claims, 1 Drawing Sheet

THREE LAYER METAL GASKET WITH DUAL COATING

FIELD OF THE INVENTION

The present invention relates to improvements in multi-layer metal gaskets.

BACKGROUND OF THE INVENTION

Gaskets are often used to seal between mating mechanical components. One common application involves gasket placement between the engine block and cylinder head of an internal combustion engine. Cylinder head gaskets typically extend around cylinder bores to provide combustion seals, maintaining the high temperature gases of combustion within the cylinder bores. Simultaneously, the gaskets also seal fluid flow openings such as coolant and oil openings to prevent undesirable mixing. In addition, such gaskets prevent leakage by sealing the areas around the bolts that connect the cylinder head and engine block. The gasket bears the load from a bolted connection of the mechanical components and relies upon that load to seal each opening.

To function reliably in the environment of an internal combustion engine, gaskets must be resistant to wear resulting from fretting corrosion, heat, and mechanical stress, particularly around cylinder bores. Thus, it is desirable to have a lubricous high temperature coating, which is "slippery" with a low coefficient of friction, protecting those portions of the gasket surrounding each cylinder bore. Simultaneously, however, a gasket must ensure an effective fluid seal around fluid flow openings. Thus, it is also desirable to have an elastomeric coating applied to those portions of the gasket surrounding fluid flow openings. It has been difficult to achieve these goals in a single gasket, particularly since it is preferable that the elastomeric coating is spaced away from those portions of the gasket surrounding cylinder bores.

Multi-layer metal gaskets have been developed which have the above-described coatings applied as indicated. Such gaskets have been difficult and expensive to produce. Typically, the gasket layers are blanked and configured with coatings selectively applied to or masked from certain portions of a side of a particular layer. Difficulties in masking and selectively applying protective coatings to layers has limited the effectiveness of such gaskets.

It is also known to use separate plates carrying the high temperature and elastomeric coatings with the elastomeric coated plates being spaced away from the cylinder bores. The varying thickness of various portions of such a gasket may create undesirable load balances between the various seals, causing problems such as insufficient sealing stress which may result in gasket failure. To provide variable thickness, gaskets have been used with additional shims.

SUMMARY OF THE INVENTION

An improved gasket for an internal combustion engine includes only three metal plates which form layers of the gasket. The gasket incorporates a dual coating system with different coatings applied to specific layers of the gasket. Thus, there is no need for masking of certain portions of a side of a particular layer or selective coating application to the side. Through orientation of the layers, a high temperature coating assures the seal around combustion bore openings while an elastomer seal coating assures the seal surrounding fluid flow openings. Through the selection of a base metal thickness and coating thicknesses, an increased thickness area can be achieved around the combustion bore openings to obtain an optimum load balance between the combustion seals and fluid seals without the use of a shim.

In a disclosed embodiment, a first metal plate is coated on both sides with an elastomeric coating. The first plate includes a first opening forming a portion of a combustion seal and a second opening spaced away from the first opening forming a portion of a fluid flow seal. A first bead is formed adjacent to the first opening and a second bead is formed adjacent to the second opening.

A second metal plate is coated with a high temperature resistant coating on an outwardly facing side which is adapted to contact an engine cylinder head and an engine block. The second plate has a base portion disposed above the first plate, a curved portion adjacent the first opening of the first plate and a flange extending from the curved portion that is spaced away and generally parallel the base portion. The base portion, curved portion, and flange of the second plate form a second portion of the combustion seal. The first bead of the first plate is disposed between the flange and base portion of the second plate. The second plate also includes an opening corresponding to and generally aligned with the second opening of the first metal plate to form a second portion of the fluid flow seal.

A third metal plate has an elastomeric coating on an outwardly facing side. The third plate is disposed above the second plate, and includes a bead which is generally aligned with the second bead of the first plate adjacent the fluid seal area. The third metal plate has an opening corresponding to and generally aligned with the second opening of the first metal plate and the opening of the second metal plate.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
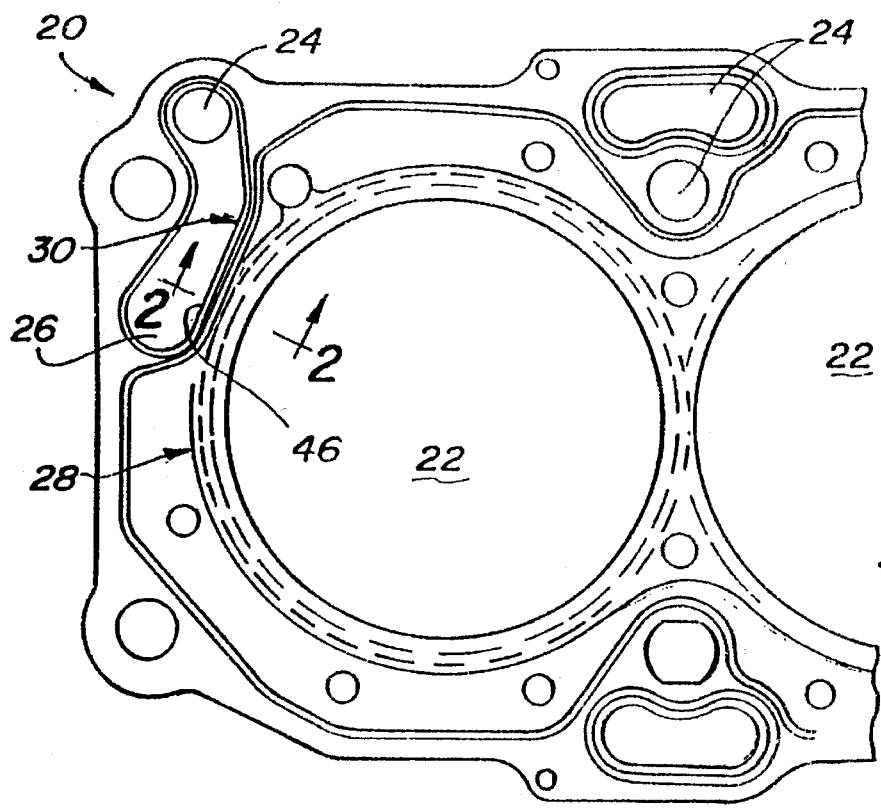
FIG. 1 is a planar view of a portion of a gasket incorporating the present invention.

A cylinder head gasket 20 adapted to be disposed between the engine head (not shown) and engine block (not shown) of an internal combustion engine is illustrated in FIG. 1. Gasket 20 includes cylinder bores 22 and fluid flow openings 24. Gasket 20 provides a combustion seal around cylinder bore openings 22 and a fluid flow seal in the area surrounding fluid flow openings 24. Gasket 20 also includes a separate sealing member 26 adjacent a high pressure fluid flow opening 24.

Figure 2:
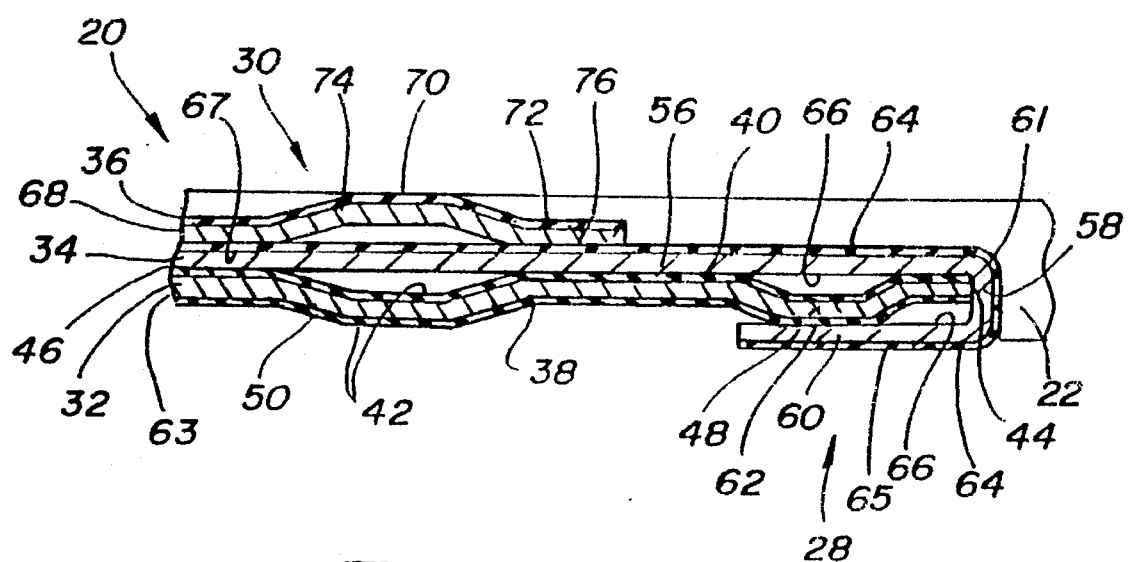
FIG. 2 is a cross-sectional view of an embodiment of the present invention taken along line 2—2 of FIG. 1.

FIG. 2 illustrates a partial cross-section of gasket 20 including a combustion seal 28 and a fluid flow seal 30. Gasket 20 comprises three plates 32, 34, and 36 with a portion of plate 34 positioned between plates 32 and 36.

Plate 32 comprises a tempered material such as full hard SAE 301 stainless steel or springsteel. A preferred thickness of plate 32 is 0.20 mm. (0.008 in.). Plate 32 is completely coated on both an outwardly facing side 38 and an inwardly facing side 40 with an elastomeric coating 42. Coating 42 assures the seal between gasket 20 and engine hardware. Coating 42 enhances the seal between plates 32 and 34. Coating 42 is preferably a rubber coating such as nitrile butadiene rubber or Viton that is approximately 0.025 mm (0.001 in.) thick on both side 38 and side 40. Plate 32 includes an opening 44 associated with combustion bore opening 22 and an opening 46 spaced away from opening 44 adapted to receive sealing member 26 with a fluid flow opening 24. A first full mechanical bead 48 is adjacent to opening 44 and a second full mechanical bead 50 is adjacent opening 46. While full mechanical beads are shown, other types of beads such as half beads may also be appropriate. In some situations, the beads may be completely excluded. Beads 48 and 50 are shown extending outwardly.

Plate 34 comprises an annealed material such as SAE 304L stainless steel, tinplate, or clad steels. A preferred thickness of plate 34 is 0.30 mm. (0.012 in.). Plate 34 has a base portion 56 disposed above plate 32, a curved portion 58 adjacent opening 44 of plate 32 to form combustion bore opening 22, and a flange 60 extending away from curved portion 58 which is spaced away and generally parallel to base portion 56. Base portion 56, curved portion 58 and flange 60 form a portion of combustion seal 28. As a result, bead 48 and an outer periphery 61 of opening 44 of plate 32 are disposed between base portion 56 and flange 60 of plate 34. In a preferred embodiment, an apex 62 of bead 48 contacts flange 60. Plate 34 also has an opening 63 which corresponds to and is generally aligned with opening 46 of plate 32. Thus, plate 34 forms a portion of fluid flow seal 30.

Plate 34 is completely coated on an outwardly facing side 64 with a high temperature resistant coating 65, plate 34 is generally not coated on an inwardly facing side 66 which is in facing relation to inwardly facing side 40 of plate 32 with elastomeric coating 42. Once plate 34 is deformed to create curved portion 58 and flange 60, coating 65 is disposed between the plate and both the engine head (not shown) and engine block (not shown) and assures combustion seal 28. Preferably, coating 65 comprises polytetrafluoroethylene ("PTFE"), sold under the registered trademark Teflon® or molybdenum disulfide to reduce friction, fretting corrosion, and to improve gas sealability. Coating 65, which is highly desirable at combustion seal 28, is not as useful at fluid seal 30. A preferred thickness for coating 65 is between 0.010 and 0.020 mm (0.0004 and 0.0008 in.) with more preferred thickness of approximately 0.0125 ram (0.0005 in.).

Plate 36 is positioned adjacent plate 34, having an inwardly facing side 67 in facing relation with outwardly facing side 64 of plate 34. Plate 36 comprises a tempered material such as full hard SAE 301 stainless steel, a spring-steel or a low carbon steel that has been zinc coated or tin plated. A preferred thickness for plate 36 is 0.20 mm (0.001 in.). Plate 36 has an opening 68 which corresponds to and is generally aligned with opening 48 of plate 32 and opening 63 of plate 34 to form a portion of fluid flow seal 30. Plate 36 has an elastomeric coating 70 similar to that of coating 42 for plate 32, but the coating is preferably only applied to an outwardly facing side 72 rather than to inwardly facing side 67. Plate 36 includes a bead 74 that is generally aligned with bead 50 of plate 32. Unlike plate 32 and 34, however, plate 36 does not comprise a portion of combustion seal 28. Instead, plate 36 ends at a base portion 76 of bead 74 which does not overlap flange 60.

When gasket 20 is tightened by the action of bolting the mechanical components together, load is first applied to fluid seal 30 because of the presence of beads 50 and 72. While beads 48, 50, and 72 are not required, they increase the sealing stress around openings 22 and 24 and help improve conformability and recovery of both combustion seal 28 and fluid seal 30. Once the gasket is tightened, however, greater stress preferably exists at combustion seal 28 with the stack-up or total thickness of combustion seal 28 greater than the stack-up thickness of fluid seal 30. Therefore, gasket 20 has a greater overall thickness at combustion seal 28 than at fluid seal 30. The thickness of combustion seal 28 comprises the overall thickness of plate 32 and plate 34 by way of base portion 56 and flange 60, including the thickness of coatings 42 and 65. The thickness of fluid seal 30 comprises the thickness of plates 34, and 36 with coatings 42, 65, and 70. To provide an optimum load balance between combustion seal 28 and fluid seal 30 together with the stiffness of the engine environment, the thickness of plates 32, 34 and 36 may be varied as well as the thickness of coatings 42, 65 and 70. Thus, no separate shim is required, reducing the total number of gasket components.

According to the present embodiment, a coating may be selectively applied to at least one entire side of a plate. The plates and layers are then oriented so that a coating is exposed where wanted. Thus, manufacturing costs are greatly reduced since the coatings do not have to be selectively applied to a part of a plate with portions of the plate masked off.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A cylinder head gasket of an internal combustion engine comprising:

three metal plates forming layers of said gasket;

at least one combustion seal and at least one fluid flow seal;

a first metal plate with a first opening and a second opening spaced away from said first opening, said first metal plate forming a first portion of said combustion seal and a first portion of said fluid flow seal;

a second metal plate with a base portion disposed above said first plate, a curved portion extending away from said base portion, and a flange extending away from said curved portion that is spaced away and generally parallel to said base portion to form a second portion of said combustion seal, an outer periphery of said first opening of said first plate disposed between said base portion and said flange, said second metal plate having an opening corresponding to and generally aligned with said second opening of said first metal plate to form a second portion of said fluid flow seal; and a third metal plate adapted to form a third portion of said fluid flow seal adjacent to said second plate, said third metal plate having an inwardly facing side in facing relation to said base portion of said second plate, but in a non-overlapping orientation with said flange of said second plate, said third metal plate having an opening corresponding to and generally aligned with said second opening of said first metal plate and said opening of said second metal plate and wherein a portion of said second plate is positioned between said first plate and said third plate.

2. A gasket as recited in claim 1, wherein said plates are oriented such that a total thickness of said gasket is greater at said combustion seal than at said fluid flow seal.

3. A gasket as recited in claim 2, wherein said first plate has an elastomeric coating on an outwardly facing side to enhance said fluid flow seal.

4. A gasket as recited in claim 3, wherein said first plate has an inwardly facing side in facing relation with an inwardly facing side of said second plate, said first plate including elastomeric coating on said inwardly facing side to enhance said fluid flow seal between said first and second plates.

5. A gasket as recited in claim 3, wherein said third plate has an elastomeric coating on an outwardly facing side to enhance said fluid flow seal.

6. A gasket as recited in claim 2, wherein said second plate has a high temperature coating on an outwardly facing side for sealing around said first opening and enhancing said combustion seal.

7. A gasket as recited in claim 2, wherein said first plate includes a bead adjacent said second opening.

8. A gasket as recited in claim 7, wherein said third plate includes a bead generally aligned with said bead of said first plate.

9. A gasket as recited in claim 2, wherein said first plate includes a bead adjacent said first opening, said bead disposed between said base portion and said flange of said second plate.

10. A cylinder head gasket of an internal combustion engine comprising:

three metal plates forming layers of said gasket;

at least one combustion seal and at least one fluid flow seal;

a first metal plate with a first opening and a second opening spaced away from said first opening, said first metal plate forming a first portion of said combustion seal and a first portion of said fluid flow seal, an elastomeric coating on an outwardly facing side of said first plate;

a second metal plate with a base portion disposed above said first plate, a curved portion extending away from said base portion, and a flange extending away from said curved portion that is spaced away and generally parallel to said base portion to form a second portion of said combustion seal, an outer periphery of said first opening of said first plate disposed between said base portion and said flange, a high temperature coating on an outwardly facing side of said second plate for sealing around said first opening when said gasket is tightened to enhance said combustion seal, said second metal plate having an opening corresponding to and generally aligned with said second opening of said first metal plate to form a second portion of said fluid flow seal; and a third metal plate adapted to form a third portion of said fluid flow seal adjacent to said second plate, said third metal plate having an inwardly facing side in facing relation to said base portion of said second plate, but in a non-overlapping orientation with said flange of said second plate, said third metal plate having an opening corresponding to and generally aligned with said second opening of said first metal plate and said opening of said second metal plate, said third metal plate having an elastomeric coating on an outwardly facing side, said elastomeric coating of said third plate working in combination with said second elastomeric coating of said first plate to enhance said fluid flow seal, wherein said plates are oriented such that a total thickness of said gasket is greater at said combustion seal than at said fluid flow seal and wherein a portion of said second plate is positioned between said first plate and said third plate.

11. A gasket as recited in claim 10, wherein said first metal plate includes an inwardly facing side, a second elastomeric coating on said inwardly facing side of said first plate to enhance said fluid flow seal between said first and second plates.

12. A gasket as recited in claim 11, wherein said first plate includes a bead adjacent said second opening and said third plate includes a bead generally aligned with said bead of said first plate.

13. A gasket as recited in claim 10, wherein said first plate includes a bead adjacent said first opening, said bead disposed between said base portion and said flange of said second plate.

14. A gasket as recited in claim 10, wherein said high temperature coating is polytetrafluoroethylene.

15. A gasket as recited in claim 10, wherein said elastomeric coatings are rubber.

16. A gasket as recited in claim 10, wherein said plates are formed from steel.

17. A gasket as recited in claim 10, wherein said plates have a generally uniform thickness, said third plate having a thickness less than a corresponding thickness of said second plate.

18. A cylinder head gasket of an internal combustion engine comprising:

three metal plates forming layers of said gasket;

at least one combustion seal and at least one fluid flow seal;

a first metal plate with a first opening and a second opening spaced away from said first opening, said first metal plate forming a first portion of said combustion seal and a first portion of said fluid flow seal, a first elastomeric coating on an outwardly facing side of said first plate and a second elastomer coating on an inwardly facing side of said first plate, said first plate having a first bead adjacent said first opening and a second bead adjacent said second opening;

a second metal plate with a base portion disposed above said first plate, a curved portion extending away from said base portion, and a flange extending away from said curved portion that is spaced away and generally parallel to said base portion to form a second portion of said combustion seal, an outer periphery of said first opening of said first plate and said second bead of said first plate disposed between said base portion and said flange, a high temperature coating on an outwardly facing side of said second plate for sealing around said first opening when said gasket is tightened to enhance said combustion seal, said second metal plate having an opening corresponding to and generally aligned with said second opening of said first metal plate to form a second portion of said fluid flow seal; and a third metal plate adapted to form a third portion of said fluid flow seal adjacent to said second plate, said third metal plate having an inwardly facing side in facing relation to said base portion of said second plate and in a non-overlapping orientation with said flange of said second plate, said third metal plate having an opening corresponding to and generally aligned with said second opening of said first metal plate and said opening of said second metal plate, a bead generally aligned with said second bead of said first plate, and an elastomeric coating on an outwardly facing side, said elastomeric coating of said third plate working in combination with said first and second elastomeric coatings of said first plate to enhance said fluid flow seal and wherein a portion of said second plate is positioned between said first plate and said third plate.

19. A gasket as recited in claim 18, wherein said plates are oriented such that a total thickness of said gasket is greater at said combustion seal than at said fluid flow seal.

* * * * *